(12) United States Patent
Nakada

(10) Patent No.: US 7,647,064 B2
(45) Date of Patent: Jan. 12, 2010

(54) MOBILE COMMUNICATIONS SYSTEM AND CONTROL TECHNIQUE THEREOF

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 704 days.

(21) Appl. No.: 11/313,932

(22) Filed: Dec. 22, 2005

(65) Prior Publication Data

US 2006/0141939 A1 Jun. 29, 2006

(30) Foreign Application Priority Data

Dec. 28, 2004 (JP) .............................. 2004-378995

(51) Int. Cl.
*H04B 7/00* (2006.01)
(52) U.S. Cl. .......................... 455/522; 455/127; 455/9; 455/13.4; 455/63.1; 370/342; 370/335
(58) Field of Classification Search ................. 455/522, 455/127.1, 13.4, 63.1, 114.2, 278.1, 296, 455/9; 370/342, 335, 320, 479, 318
See application file for complete search history.

(56) References Cited

U.S. PATENT DOCUMENTS

| 5,504,803 | A | * | 4/1996 | Yamada et al. ............ 455/426.1 |
| 5,737,695 | A | * | 4/1998 | Lagerqvist et al. ............. 455/79 |
| 5,828,661 | A | * | 10/1998 | Weaver et al. ................ 370/331 |
| 6,137,789 | A | * | 10/2000 | Honkasalo ................... 370/342 |
| 6,480,472 | B1 | * | 11/2002 | Jou et al. ...................... 370/252 |
| 6,487,191 | B1 | * | 11/2002 | Kang et al. ................... 370/342 |
| 6,510,148 | B1 | * | 1/2003 | Honkasalo ................... 370/342 |
| 6,615,044 | B2 | * | 9/2003 | Tigerstedt et al. ............. 455/437 |
| 6,628,631 | B1 | * | 9/2003 | Mazawa et al. .............. 370/331 |
| 6,885,674 | B2 | * | 4/2005 | Hunt et al. ................... 370/420 |
| 6,907,250 | B2 | * | 6/2005 | Ishikawa et al. ............. 455/450 |
| 6,975,605 | B2 | * | 12/2005 | Hirahara ...................... 370/331 |
| 6,999,438 | B2 | * | 2/2006 | Nounin et al. ............... 370/332 |
| 7,069,051 | B1 | * | 6/2006 | Katz ......................... 455/562.1 |
| 2001/0004597 | A1 | * | 6/2001 | Hirahara ...................... 455/442 |
| 2002/0077110 | A1 | * | 6/2002 | Ishikawa et al. ............. 455/452 |
| 2003/0002462 | A1 | * | 1/2003 | Tanoue ........................ 370/335 |
| 2003/0067897 | A1 | * | 4/2003 | Black .......................... 370/335 |
| 2004/0166899 | A1 | * | 8/2004 | Nakayasu .................... 455/560 |
| 2007/0218905 | A1 | * | 9/2007 | Lee ............................. 455/436 |
| 2008/0008147 | A1 | * | 1/2008 | Nakayama .................. 370/338 |
| 2008/0013476 | A1 | * | 1/2008 | Vasudevan .................. 370/328 |
| 2008/0107091 | A1 | * | 5/2008 | Ramachandran ............ 370/338 |

FOREIGN PATENT DOCUMENTS

| CN | 1362796 A | 8/2002 |
| JP | 2000-91982 | 3/2000 |
| JP | 2003-18068 | 1/2003 |

\* cited by examiner

*Primary Examiner*—Minh D Dao
(74) *Attorney, Agent, or Firm*—Whitham Curtis Christofferson & Cook, PC

(57) ABSTRACT

Each mobile terminal and/or radio base station determines whether a radio base station transmits radio waves of excessive power. Based on determination results obtained by a plurality of mobile terminals and/or radio base stations, a radio-system management server determines whether a certain radio base station transmits radio waves of excessive power. When the certain radio base station transmits radio waves of excessive power, the radio-system management server instructs the certain radio base station to forcefully stop its radio transmission by transmitting a forced transmission-stop control message to the radio network controller that controls the certain radio base station.

27 Claims, 7 Drawing Sheets

MOBILE COMMUNICATIONS SYSTEM AND CONTROL TECHNIQUE THEREOF

BACKGROUND OF THE INVENTION

1. Field of the Invention

The present invention relates to a mobile communications system, and more particularly to a control technique for the mobile communications system so as to keep system throughput at a proper level.

2. Description of the Related Art

With the recent widespread of communication terminals, such as mobile telephone terminals and personal computers, multiple-access techniques have been developed to efficiently multiplex radio signals transmitted by a plurality of user terminals located at multiple geographic points. As known well, CDMA (Code Division Multiple Access) is one of the multiple-access techniques. In the CDMA system, high-speed bidirectional transmission power control is performed at all times between a mobile terminal and a base station so that the predetermined reception quality can be ensured at one party by optimizing the transmission power of the other party.

Japanese Patent Application Unexamined Publication No. 2000-91982 discloses a technique of avoiding communication quality degradation in the CDMA mobile radio communications system. More specifically, a base station monitors the transmission information of each mobile station at all times. When detecting a failed mobile station transmitting abnormal output, the base station transmits a transmission stop instruction to the failed mobile station and checks whether an acknowledgement is received from the failed mobile station. If no acknowledgement is received, the base station forcefully stops transmitting radio waves to the failed mobile station.

However, in a case where a malfunction or degradation of receiving performance occurs in some mobile terminals of the CDMA system, such a mobile terminal cannot ensure the preset reception quality, therefore continuing to transmit a request for increasing the transmission power of a downlink signal transmitted from a base station. As a result, the transmission power of a downlink signal transmitted from the base station to these mobile terminals becomes greater than necessary. Such power-increased radio waves may adversely affect communications of other mobile terminals as interference waves.

Japanese Patent Application Unexamined Publication No. 2003-18068 discloses a CDMA system which has functions of: detecting a mobile terminal with a malfunction or degradation of receiving performance; and controlling such that the transmission power of a downlink signal to such a mobile terminal is not increased to avoid interference with communications of other mobile terminals. More specifically, the base station notifies a base station controller of the transmission power level of a downlink signal from the base station to a mobile terminal. The base station controller determines that the mobile station is out of order when the transmission power level exceeds a predetermined threshold for a predetermined time period. Such a failed mobile terminal is registered into a mobile terminal management database. The base station controller, when receiving a call set-up request from the failed mobile station, sets the failed mobile station to a target communication quality level lower than normal. If the failed mobile station continues to transmit a transmission power increasing request even in the case of the target communication quality level, then the base station controller rejects the call setup request received from the failed mobile station.

As described above, the conventional mobile communications systems are capable of detecting system failure due to a malfunction of a mobile terminal. However, there are cases where interference power increases due to not only the failure of a mobile terminal but also failures or the like in a base station.

With downsizing and cost-reduction of a radio base station in a mobile telephone system, a small-size radio base station has been developed for home use. Accordingly, an ordinary user who is not a mobile telephone carrier can possess a radio base station and may modify or adjust it without authorization or permission. Especially, modifications of a transmission power amplifier to increase the transmission power of radio signals may be relatively easy, compared with a base band signal processor, and probably bring much merit to its user. Therefore, concerns are rising that such unauthorized modifications become widespread.

Further, compared with radio base stations managed by the common carrier, a home-use radio base station may be used sloppily and therefore becomes susceptible to failure. If a failed radio base station has been used, it is considered that the transmission power of the failed radio base station becomes greater than the prescribed level. The increased transmission power reduces the radio-channel error rate of the mobile terminals under the radio base station and improves their throughput. However, as described before, such power-increased radio waves may adversely affect communications of other mobile terminals under another radio base station as interference waves. Especially, a mobile communications system such as a CDMA telephone system uses the same frequency among radio base stations and therefore the power-increased radio waves have a very large influence on other communications.

In the case of CDMA mobile communications system, the possible number of users accommodated in the system and its throughput are dependent on the ratio of signal power to interference power. Accordingly, as the transmission power of each user or base station becomes larger, it causes interfering with the communications of other users or base stations.

When the interference with the communications of the radio base station and mobile terminals accommodated therein is becoming larger, their transmission power controllers increase their transmission power so as to reduce the influence of the interference. This increased transmission power in turn affects the communications of other radio base stations and mobile terminals accommodated therein. Such transmission power increasing control is successively repeated, which increases the total power consumption in the system and reduces the possible number of users accommodated in the system and the system throughput.

SUMMARY OF THE INVENTION

An object of the present invention is to provide a mobile communications system and the control method thereof, which are capable of suppressing an increase of interference power due to excessively increased transmission power of a radio base station and efficiently avoiding a reduction of the possible number of users accommodated in the system and the system throughput.

According to the present invention, each mobile terminal and/or radio base station is provided with first determination means for determining whether a radio base station transmits radio waves of excessive power. Such first determination means may be provided in one or both of a mobile terminal and a radio base station. Preferably, the mobile terminals and the radio base stations are all provided with such determination means. Based on determination results obtained by a plurality of mobile terminals and/or radio base stations, second determination means of a radio-system management server determines whether a certain radio base station transmits radio waves of excessive power. When it is determined that the certain radio base station transmits radio waves of excessive power, control means of the radio-system management server instructs the certain radio base station to forcefully stop its radio transmission, for example, by transmitting a forced transmission-stop control message to the certain radio base station.

The first determination means may use power of a radio wave received from the certain radio base station to determine whether the certain radio base station transmits radio waves of excessive power. According to an embodiment, when the power of a radio wave received from the certain radio base station exceeds a predetermined power threshold successively a predetermined number of times, the first determination means determines that the certain radio base station transmits radio waves of excessive power, and transmits a piece of detection information to the radio-system management server.

Preferably, the second determination means determines whether the certain radio base station transmits radio waves of excessive power, based on the number of pieces of detection information received. When the number of pieces of detection information received exceeds a predetermined threshold count for a predetermined period of time, the second determination means determines that the certain radio base station transmits radio waves of excessive power.

As described above, the transmission power level of any radio base station can be monitored by mobile terminals or other radio base stations. Accordingly, when a certain radio base station transmits a radio signal of excessively increased transmission power, a system manager can be informed of detection information indicating that the certain radio base station transmits radio waves of excessively increased transmission power.

When the number of pieces of received detection information exceeds a predetermined threshold, the system manger instructs the certain radio base station to stop radio transmission, which causes avoiding an increase of interference power due to the excessively increased transmission power and also avoiding a decrease of the possible number of users accommodated in the system and its system throughput. In the case where a radio base station is provided with a radio receiver for other base stations other than a main radio transceiver for communicating with mobile terminals, it is ensured that the radio base station receives a radio signal of excessively increased transmission power.

DETAILED DESCRIPTION OF THE PREFERRED EMBODIMENTS

Figure 1:
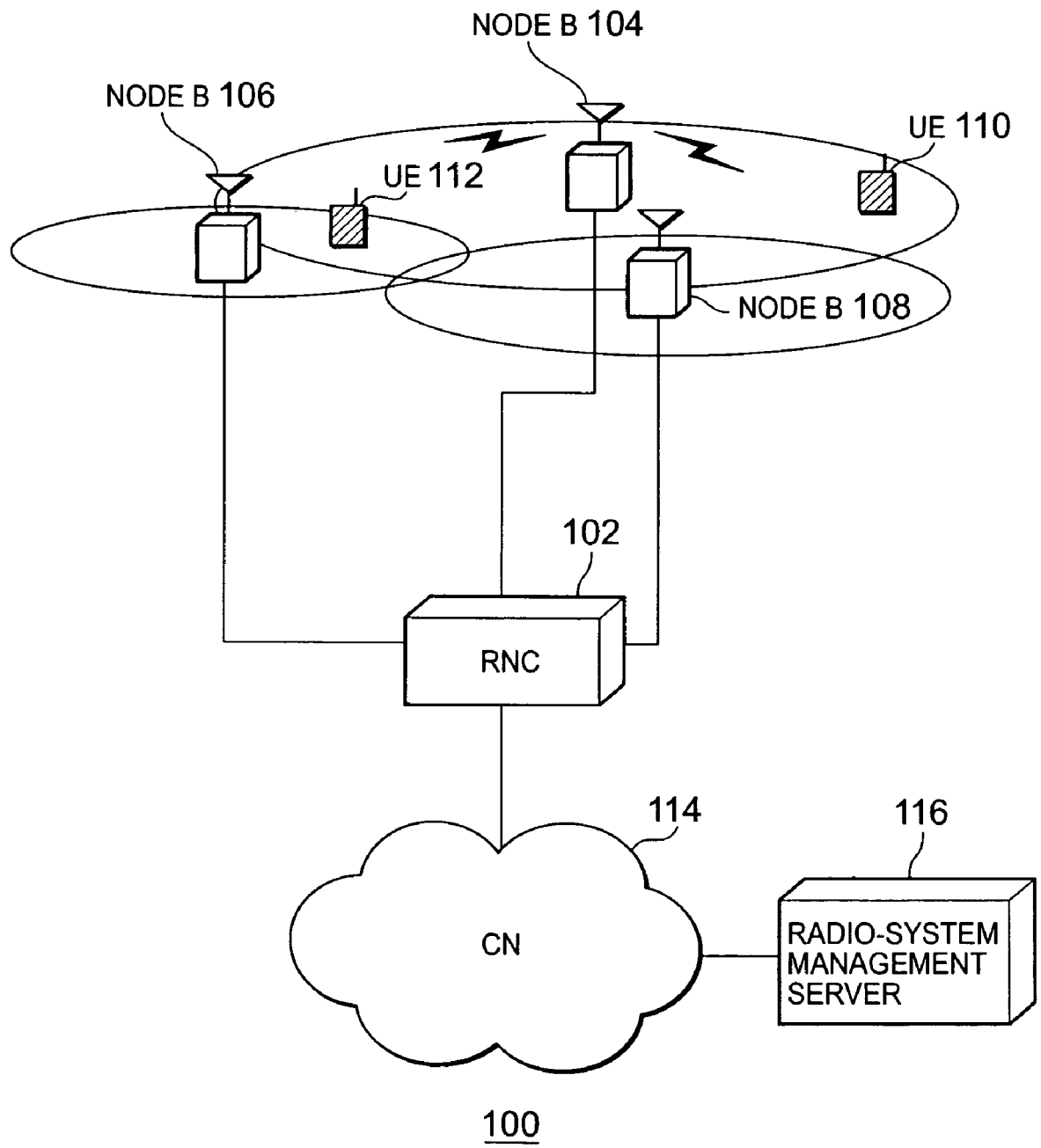
FIG. 1 is a schematic diagram showing a mobile communications system according to an embodiment of the present invention.

Referring to FIG. 1, a mobile communications system 100 is an example of a DS-CDMA cellular telephone system to which an embodiment of the present invention is applied. Here, the DS-CDMA cellular telephone system is defined in 3GPP (The 3rd Generation Partnership Project). If necessary, see the Web site identified by "http://www.3gpp.org/".

The mobile communications system 100 includes a radio network controller (RNC) 102 which accommodates a plurality of radio base stations Node B (here, as an example, denoted by 104, 106, 108). Each of the radio base stations Node B is capable of accommodating a plurality of mobile terminals such as mobile telephone terminals, which are denoted, as an example, by UE (user equipment) 110 and 112. The radio network controller (RNC) 102 is connected to a radio-system management server 116 through a core network (CN) 114.

The radio network controller (RNC) 102 directly controls the radio base stations 104, 106 and 108. The radio network controller (RNC) 102 further connects to the core network 114 including a plurality of switches, gateways and servers, through which it can communicate control information of the radio base stations 104, 106 and 108 with the radio-system management server 116. In FIG. 1, the mobile terminal 110 is located within the radio zone of the radio base station 104 and the mobile terminal 112 is located within both the radio zone of the radio base station 104 and that of the radio base station 106. In this example, CDMA scheme is employed for transmission and reception of signals.

Figure 2:
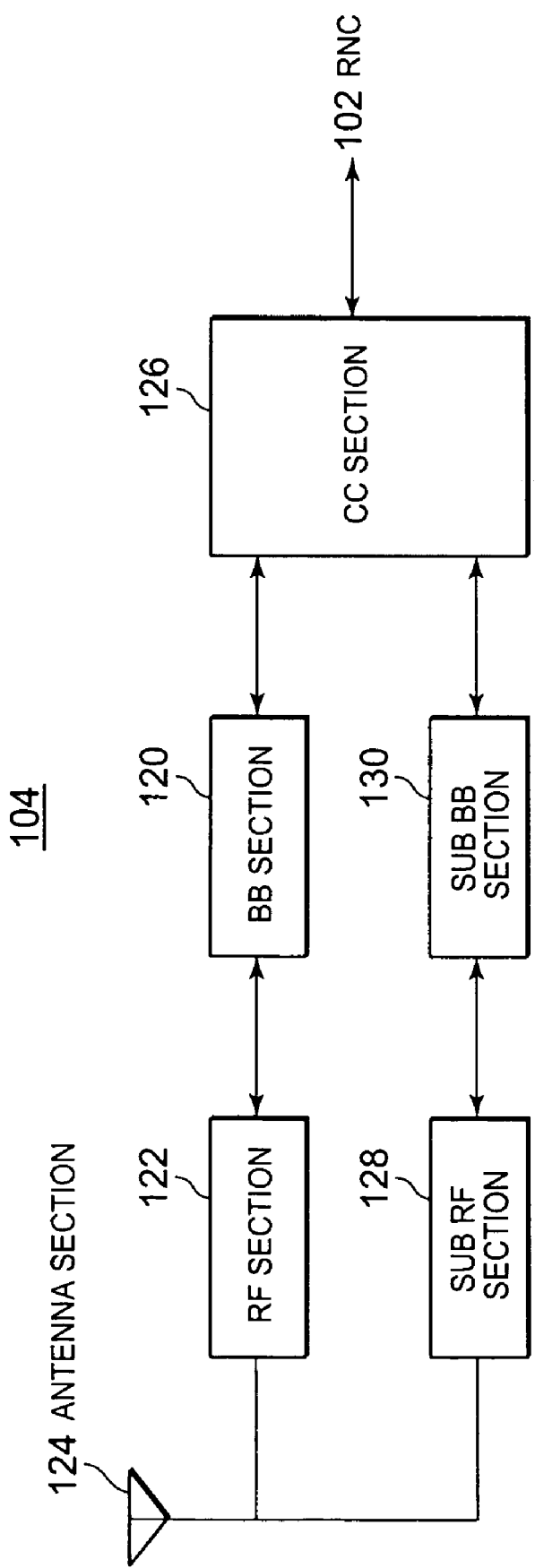
FIG. 2 is a block diagram showing a radio base station of the mobile communications system according to the embodiment.

Referring to FIG. 2, each of the radio base stations installed in the mobile communications system includes a base band (BB) section 120, a radio-frequency (RF) section 122, an antenna section 124 and a core control (CC) section 126, which are similar to the existing radio base station. The BB section 120 performs digital signal processing of radio channels and logical channels. The RF section 122 performs modulation, demodulation and transmission power control. The antenna section 124 includes a signal amplifier to transmit and receive radio signals to and from mobile terminals. The CC section 126 manages the radio base station itself and has a function of interfacing to the radio network controller 102 so that the radio network controller 102 or the radio-system management server 116 can control the operations including radio transmission of the radio base station itself.

The radio base station according to the present embodiment is further provided with a sub RF section 128 and a sub BB section 130, which are used to receive radio signals from other radio base stations. The sub RF section 128 has a function of demodulating radio signals received from other radio base stations. The sub BB section 130 has a function of decoding PCCPCH (Primary Common Control Physical Channel) according to a spreading-code sequence used by each of other radio base stations, which is previously received from the radio network controller 102, and of checking the broadcast information included in the decoded signal. The sub BB section 130 further has a function of measuring the received power level of CPICH (Common Pilot Channel). The function of the antenna section 124 is similar to that of the existing radio base station. Since each radio base station is provided with a function of receiving radio signals transmitted from another radio base station, it is capable of determining whether the other radio base station is transmitting radio signals of excessive transmission power. The determination whether the transmission power of another radio base station is excessive will be described in detail later.

The core control section 126 may be a program-controlled processor such as a CPU, on which the determination, transmission stop control and other operations are performed according to programs stored in a memory (not shown).

Hereinafter, transmission control according to the present embodiment of the present invention will be described with reference to FIGS. 3 and 4, taking as an example the case where the radio base station 104 is transmitting radio signals at excessive transmission power, which may be caused by some failure or by modifying its signal amplifier.

Figure 3:
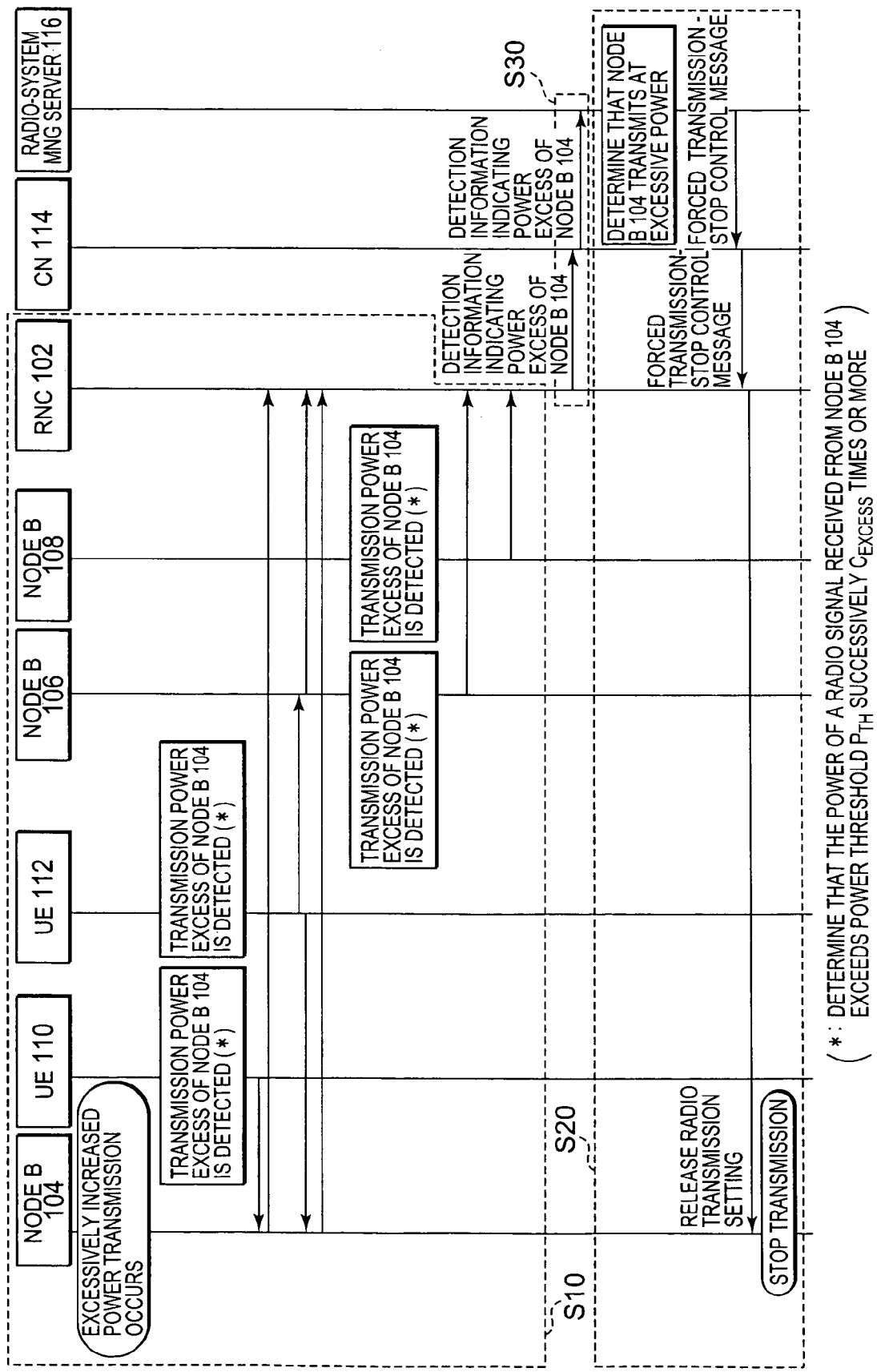
FIG. 3 is a diagram showing a sequence of operations from an excessively increased transmission power check step to a forced transmission-stop step in the embodiment.

As shown in FIG. 3, the transmission control of the mobile communications system 100 includes a transmission-power excess check sequence S10, a forced transmission-stop determination sequence S20, and a detection information transfer sequence S30. The transmission-power excess check sequence S10 includes sequences S12-S16 as shown in FIG. 4.

The mobile terminals (UEs) 110 and 112 receive radio waves on PCCPCH and CPICH that are transmitted at all times from the radio base station 104. The mobile terminals 110 and 112 decode PCCPCH to obtain information regarding the radio base station 104 such as its identification and spread-code information. Further, each of the mobile terminals 110 and 112 performs signal processing of CPICH to obtain reception timing and received signal power, which are information necessary for path diversity. Details of PCCPCH and CPICH are described in the technical specifications such as 3GPP TS25.133 and 3GPP TS25.211.

Subsequently, each of the mobile terminals 110 and 112 determines whether the radio base station 104 transmits radio signals of excessive transmission power. More specifically, each of the mobile terminals 110 and 112 has a power threshold PTH and a count threshold CEXCESS previously set therein. These power threshold PTH and count threshold CEXCESS may be received through one of the radio base stations 104, 106 and 108 from a host station such as the radio network controller 102, the core network 114 or the radio-system management server 116. First, each of the mobile terminals 110 and 112 performs a threshold comparison step of determining whether the received signal power exceeds the power threshold PTH. This threshold comparison step is performed every time the received signal power is updated periodically. If the received signal power exceeds the power threshold PTH successively CEXCESS times or more, then it is determined that the radio base station 104 transmits radio signals of excessive transmission power.

Figure 4:
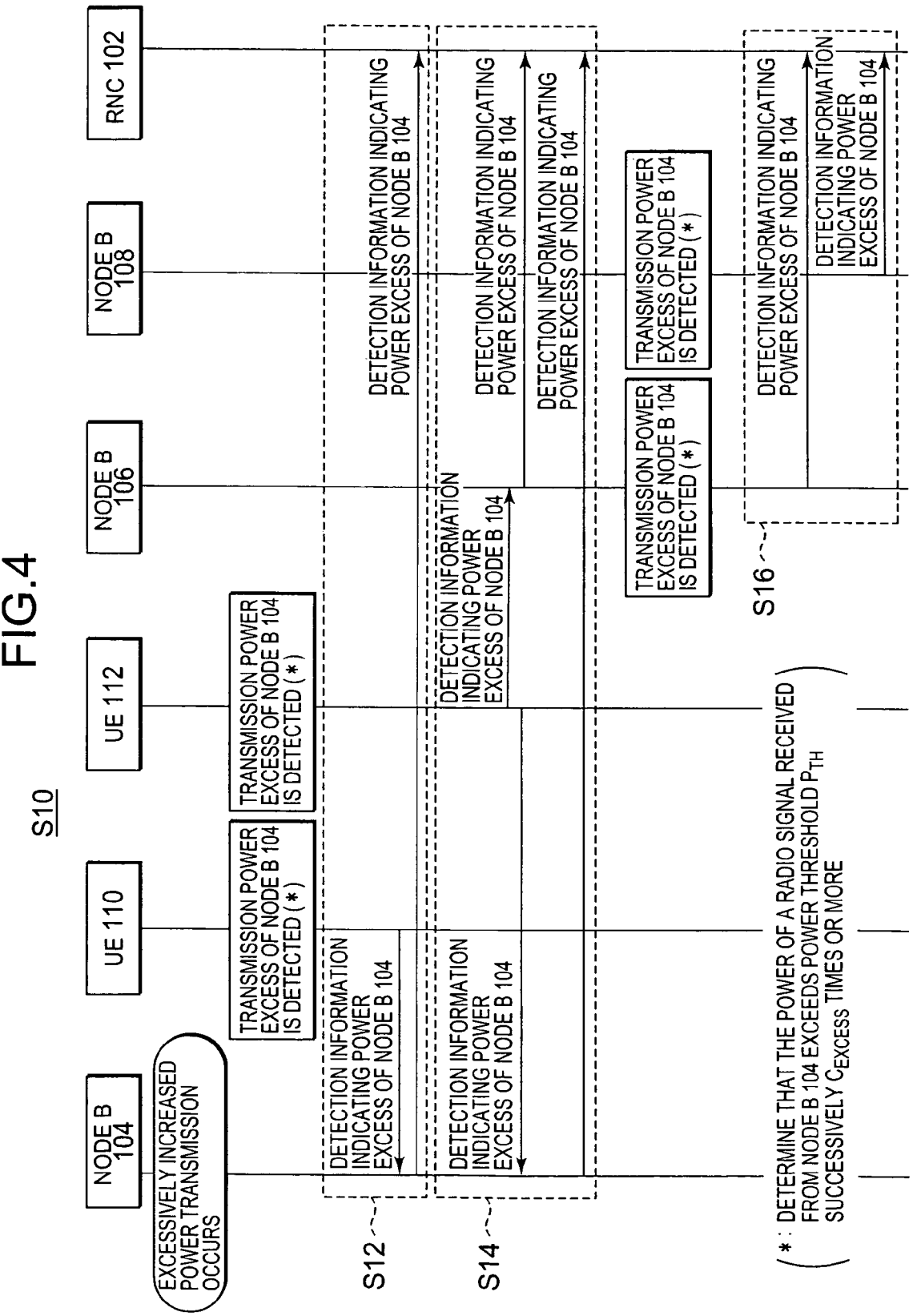
FIG. 4 is a diagram showing a sequence of detailed operations of the excessively increased transmission power check as shown in FIG. 3.

As shown in FIG. 4, when the mobile terminal 110 detects the power excess of the radio base station 104 as described above, the mobile terminal 110 transmits the detection information as well as the identification and spread-code information of the radio base station 104 to the radio network controller 102 via the radio base station 104 (step S12). When the mobile terminal 112 in a soft handover state, which is located in an overlap radio zone of the radio base stations 104 and 106, detects the power excess of the radio base station 104 as described above, the mobile terminal 112 transmits the detection information as well as the identification and spread-code information of the radio base station 104 to the radio network controller 102 via each of the radio base stations 104 and 106 (step S14).

As known well, each mobile terminal may be provided with a program-controlled processor such as a CPU on which the above-described determination can be performed according to programs stored in a memory (not shown).

As described before, each of the radio base stations 106 and 108 is capable of using the sub RF section 128 and the sub BB section 130 to receive radio signals from other radio base stations (here, the radio base station 104). Accordingly, each of the radio base stations 106 and 108 can also determine whether the radio base station 104 transmits radio signals of excessive transmission power. In the case where each of the radio base stations 106 and 108 also performs the determination whether another radio base station transmits radio signals of excessive transmission power, the frequency of such determination performed by a mobile terminal 110 or 112 can be reduced or such determination cannot be performed more than necessary. Accordingly, the mobile terminals 110 and 112 can operate under decreased load, resulting in reduced power consumption of the mobile terminals 110 and 112. In contrast to a mobile terminal, a radio base station rarely moves and therefore can reliably perform the determination at regular intervals. Hereinafter, the determination whether the radio base station 104 transmits radio signals of excessive transmission power, which is performed by the radio base stations 106 and 108 will be described.

Referring to FIG. 4, each of the radio base stations 106 and 108 has a power threshold $P_{TH\text{-}B}$ and a count threshold $C_{EXCESS\text{-}B}$ previously set therein. These power threshold $P_{TH\text{-}B}$ and count threshold $C_{EXCESS\text{-}B}$ may vary from one base station to another. The power threshold $P_{TH\text{-}B}$ and count threshold $C_{EXCESS\text{-}B}$ may be received from a host station such as the radio network controller 102, the core network 114 or the radio-system management server 116. It is not necessary that the power threshold $P_{TH\text{-}B}$ and the count threshold $C_{EXCESS\text{-}B}$ are equal to the power threshold $P_{TH}$ and the count threshold $C_{EXCESS}$ of the mobile terminal, respectively.

First, each of the radio base stations 106 and 108 performs a threshold comparison step of determining whether the power of a signal received from the radio base station 104 exceeds the power threshold PTH-B. This threshold comparison step is performed every time the received signal power is updated periodically. If the received signal power exceeds the power threshold PTH-B successively CEXCESS-B times or more, then it is determined that the radio base station 104 transmits radio signals of excessive transmission power. In this way, when the radio base stations 106 and 108 each detect the power excess of the radio base station 104 as described above, the radio base stations 106 and 108 transmit the detection information as well as the identification and spread-code information of the radio base station 104 to the radio network controller 102 (step S16).

As described above, the radio network controller 102 receives the detection information indicating the power excess of the radio base station 104 from respective ones of the mobile terminals 110 and 112 and the radio base stations 106 and 108. The radio network controller 102 periodically collects the detection information that has been received for each period of time and transmits it to the radio-system management server 116 through the core network 114 (step S30).

In the case where a plurality of pieces of detection information about the radio base station 104 have been received from a mobile terminal in the soft handover state between the radio base stations 104 and 106 (here, mobile terminal 112), the radio network controller 102 transmits one of these same pieces of detection information or a combined one of them to the radio-system management server 116.

The radio-system management server 116 counts the number of times the detection information on the radio base station 104 has been received for each radio base station and, based on the counts, determines which radio base station is transmitting radio signals of excessive transmission power. In the case where such a radio base station is detected, the radio-system management server 116 instructs that radio base station to forcedly stop transmitting. Some determination methods will be described hereinafter.

1) Determination Method I

According to a first determination method, the radio-system management server 116 counts the number of times the detection information about the radio base station 104 has been received regardless of whether a source of transmitting the detection information is a mobile terminal or a radio base station. When its count reaches a predetermined value, the radio-system management server 116 transmits a forced transmission-stop control message to the detected radio base station that is transmitting radio signals of excessive transmission power.

Figure 5:
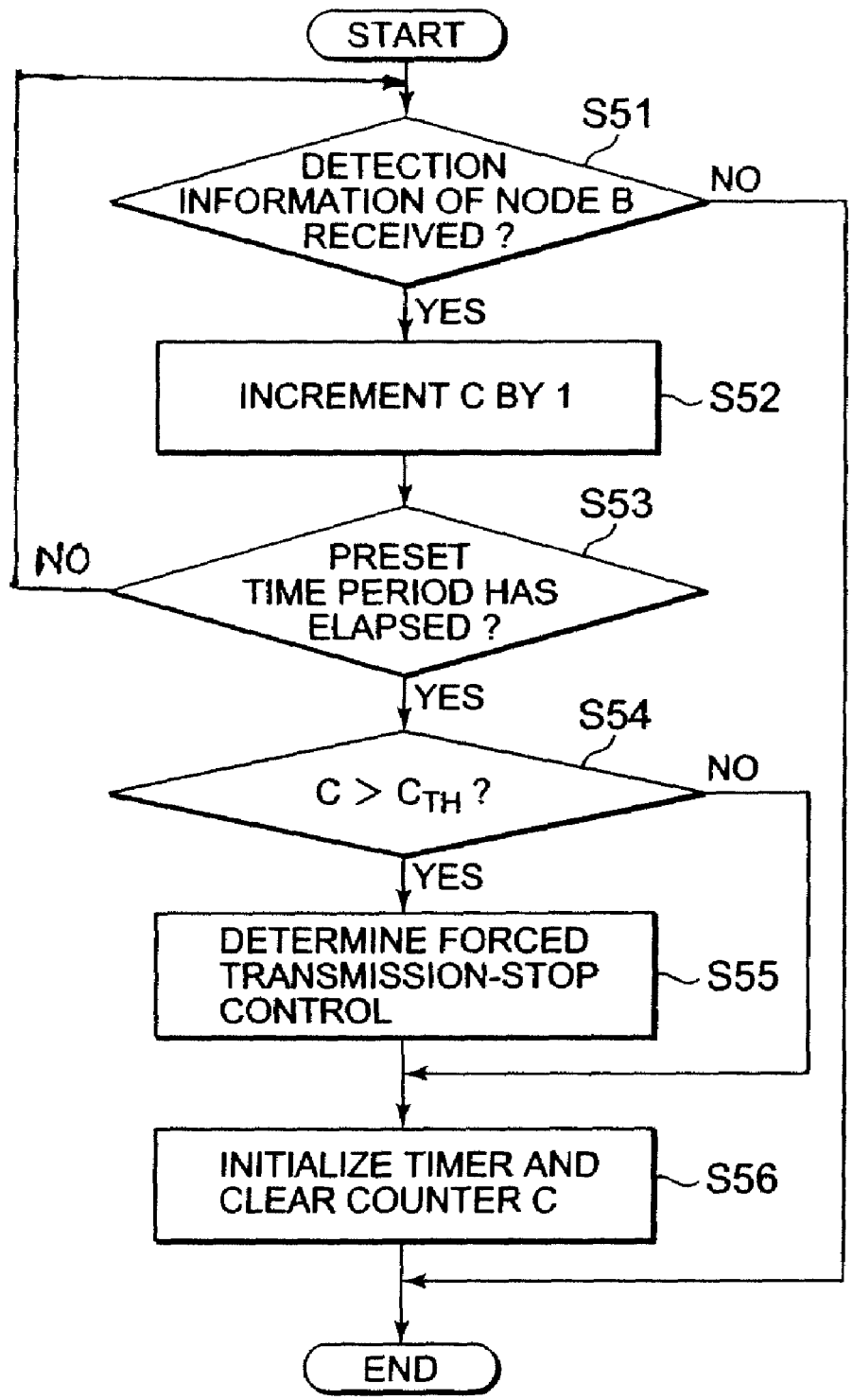
FIG. 5 is a flowchart showing a first example of forced transmission-stop control performed by a radio-system management server in the embodiment.

Referring to FIG. 5, the radio-system management server 116 determines whether a piece of detection information indicating that the radio base station 104 is transmitting radio signals of excessive transmission power is received (step S51). When no detection information is received (NO in step S51), the control exits this determination routine. When any detection information has been received (YES in step S51), a counter C previously installed in the radio-system management server 116 is incremented by one (step S52).

Subsequently, it is determined whether a predetermined time period has elapsed (step S53). When the predetermined time period has not elapsed (NO in step S53), the control returns to step S51 in this determination routine. When the predetermined time period has elapsed (YES in step S53), it is determined whether the counter C is greater than a predetermined value CTH (step S54). When the counter C has reached the predetermined value CTH (YES in step S54), the radio-system management server 116 determines that forced transmission-stop control should be applied to the radio base station 104, which is specified as an excessive transmission-power base station by other radio base stations and mobile terminals (step S55). Thus, the radio-system management server 116 transmits a forced transmission-stop control message to the radio network controller 102 through the core network 114. When receiving the forced transmission-stop control message, the radio network controller 102 releases all the radio transmission settings for the radio base station 104 to stop transmission (see the sequence S20 of FIG. 3). Accordingly, the radio base station 104 stops transmitting radio waves and thereby an increase of interference power due to excessively increased transmission power of the radio base station 104 can be efficiently suppressed.

After the forced transmission-stop control has been determined (step S55) or When the counter C has not reached the predetermined value $C_{TH}$ yet (NO in step S54), the radio-system management server 116 initializes the timer for measuring the predetermined time period and clears the counter C (step S56) and then the control exits this determination routine.

2) Determination Method II

According to a second determination method, the radio-system management server 116 modifies the number of times the detection information about the radio base station 104 has been received with weights determined depending on whether a source of transmitting the detection information is a mobile terminal. When its count reaches a predetermined value, the radio-system management server 116 transmits a forced transmission-stop control message to the detected radio base station that is transmitting radio signals of excessive transmission power.

Figure 6:
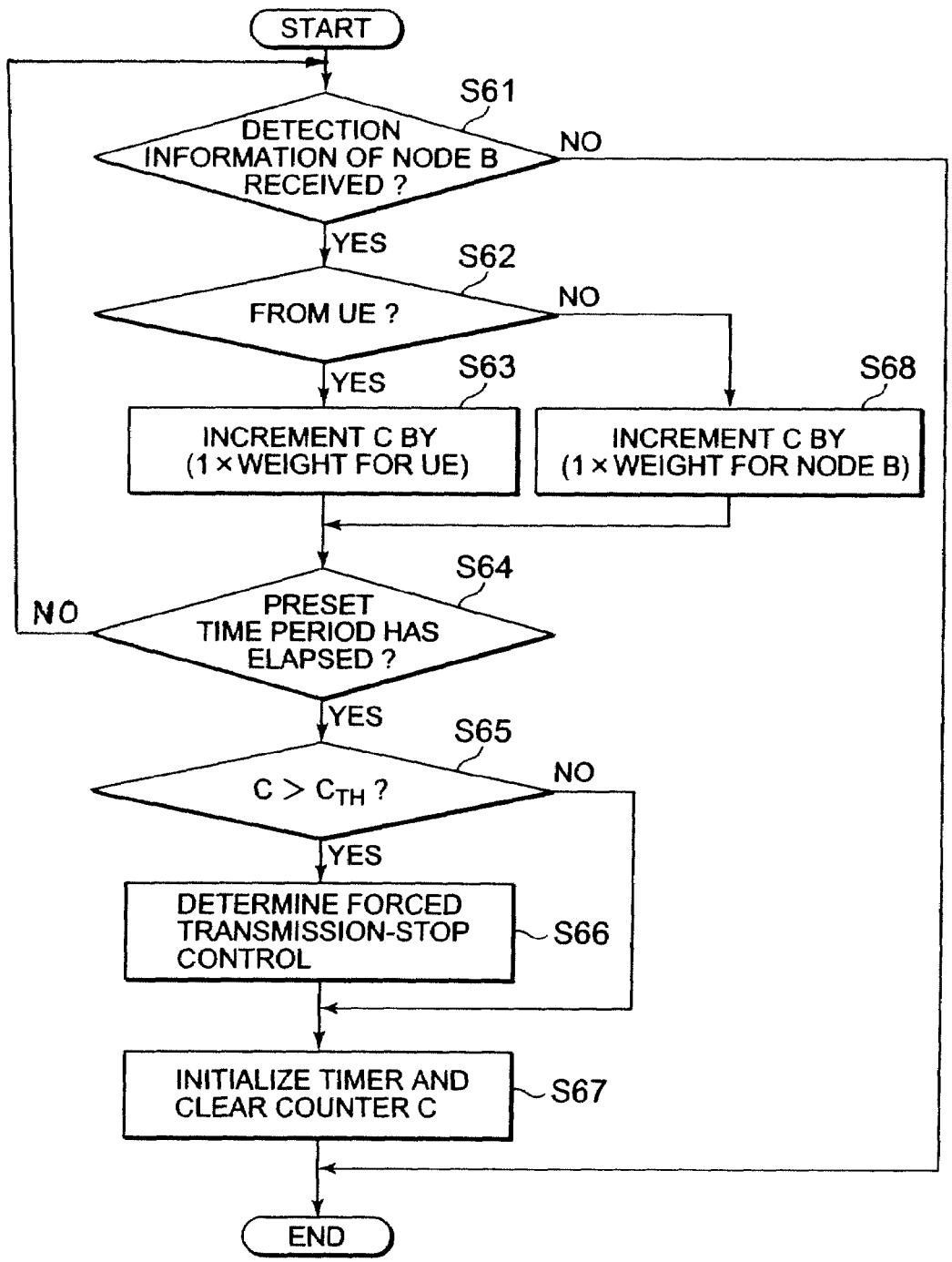
FIG. 6 is a flowchart showing a second example of forced transmission-stop control performed by a radio-system management server in the embodiment.

Referring to FIG. 6, the radio-system management server 116 determines whether a piece of detection information indicating that the radio base station 104 is transmitting radio signals of excessive transmission power is received (step S61). When no detection information is received (NO in step S61), the control exits this determination routine.

When any detection information has been received (YES in step S61), it is determined whether a source of transmitting the detection information is a mobile terminal (step S62). When the source is a mobile terminal (YES in step S62), a counter C previously installed in the radio-system management server 116 is incremented by (UE-weight×1) (step S63). Here, UE-weight is a weight for mobile terminal, which is determined when the source is a mobile terminal. When the source is not a mobile terminal, that is a radio base station (NO in step S62), the counter C is incremented by (BS-weight×1) (step S68). Here, BS-weight is a weight for radio base station, which is determined when the source is a radio base station.

Subsequently, it is determined whether a predetermined time period has elapsed (step S64). When the predetermined time period has not elapsed (NO in step S64), the control returns to step S61 in this determination routine. When the predetermined time period has elapsed (YES in step S64), it is determined whether the counter C is greater than a predetermined value CTH (step S65). When the counter C has reached the predetermined value CTH (YES in step S65), the radio-system management server 116 determines that forced transmission-stop control should be applied to the radio base station 104, which is specified as an excessive transmission-power base station by other radio base stations and mobile terminals (step S66). Thus, the radio-system management server 116 transmits a forced transmission-stop control message to the radio network controller 102 through the core network 114. When receiving the forced transmission-stop control message, the radio network controller 102 releases all the radio transmission settings for the radio base station 104 to stop transmission (see the sequence S20 of FIG. 3). Accordingly, the radio base station 104 stops transmitting radio waves and thereby an increase of interference power due to excessively increased transmission power of the radio base station 104 can be efficiently suppressed.

After the forced transmission-stop control has been determined (step S66) or when the counter C has not reached the predetermined value $C_{TH}$ yet (NO in step S65), the radio-system management server 116 initializes the timer for measuring the predetermined time period and clears the counter C (step S67) and then the control exits this determination routine.

3) Determination Method III

According to a third determination method, the radio-system management server 116 is provided with a first counter $C_{UE}$ for mobile terminal and a second counter $C_{NODE-B}$ for radio base station, and has a first predetermined value $C_{TH1}$ and a second predetermined value $C_{TH2}$. The first and second predetermined values $C_{TH1}$ and $C_{TH2}$ correspond to the first and second counters $C_{UE}$ and $C_{NODE-B}$, respectively and may be set to different values independently. The first and second predetermined values $C_{TH1}$ and $C_{TH2}$ may be equal to each other. The radio-system management server 116 selectively counts the number of times the detection information about the radio base station 104 has been received depending on whether a source of transmitting the detection information is a mobile terminal or a radio base station. When at least one of the first and second counters $C_{UE}$ and $C_{NODE-B}$ reaches a corresponding one of the first and second predetermined values $C_{TH1}$ and $C_{TH2}$, the radio-system management server 116 transmits a forced transmission-stop control message to the detected radio base station that is transmitting radio signals of excessive transmission power.

Figure 7:
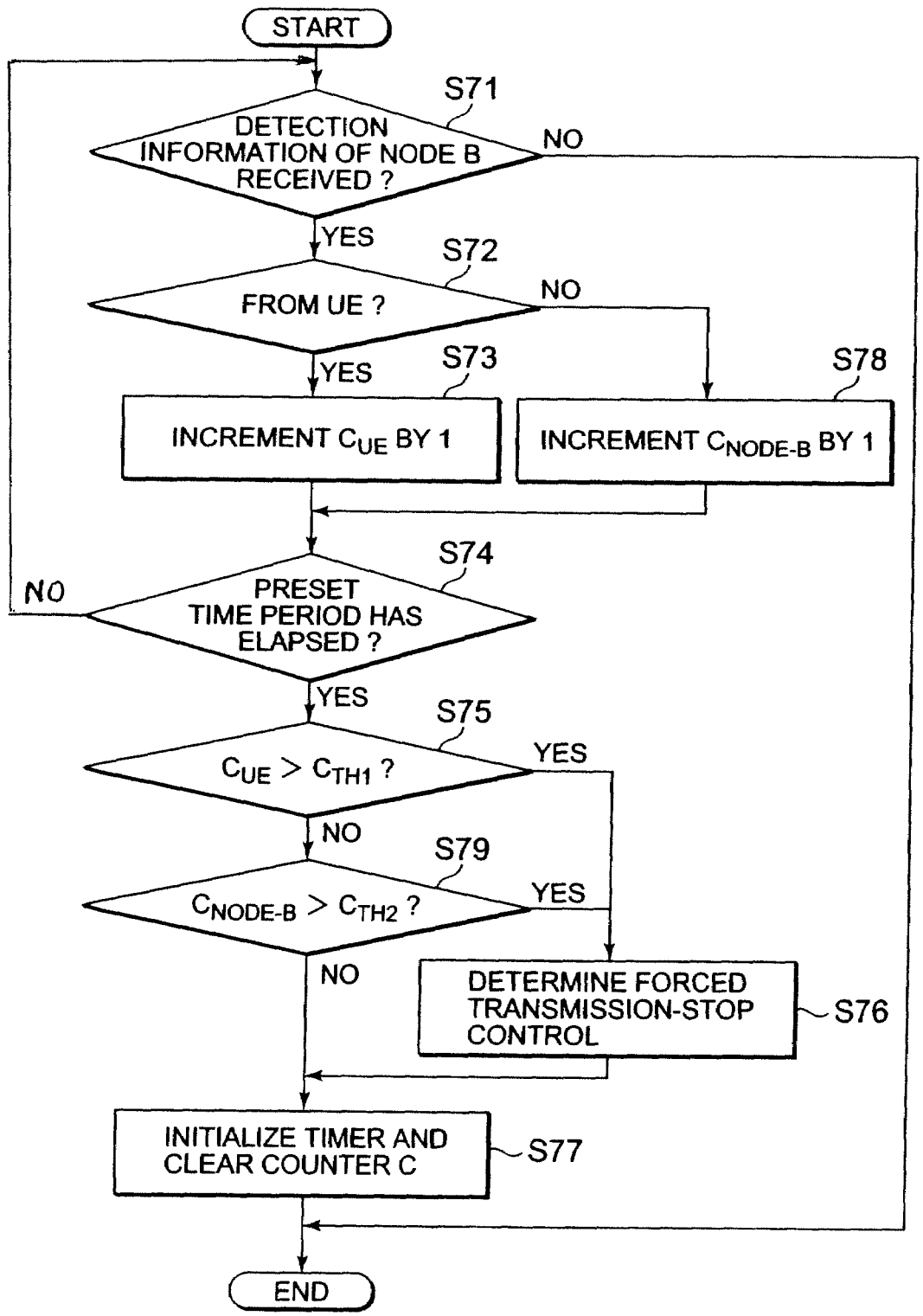
FIG. 7 is a flowchart showing a third example of forced transmission-stop control performed by a radio-system management server in the embodiment.

Referring to FIG. 7, the radio-system management server 116 determines whether a piece of detection information indicating that the radio base station 104 is transmitting radio signals of excessive transmission power is received (step S71). When no detection information is received (NO in step S71), the control exits this determination routine.

When any detection information has been received (YES in step S71), it is determined whether a source of transmitting the detection information is a mobile terminal (step S72). When the source is a mobile terminal (YES in step S72), the first counter $C_{UE}$ is incremented by one (step S73). When the source is not a mobile terminal, that is a radio base station (NO in step S72), the second counter $C_{NODE-B}$ is incremented by one (step S78).

Subsequently, it is determined whether a predetermined time period has elapsed (step S74). When the predetermined time period has not elapsed (NO in step S74), the control returns to step S71 in this determination routine. When the predetermined time period has elapsed (YES in step S74), it is determined whether the first counter CUE is greater than the first predetermined value CTH1 (step S75). When the first counter CUE has reached the predetermined value CTH1 (YES in step S75), the radio-system management server 116 determines that forced transmission-stop control should be applied to the radio base station 104, which is specified as an excessive transmission-power base station by other radio base stations and mobile terminals (step S76). Thus, the radio-system management server 116 transmits a forced transmission-stop control message to the radio network controller 102 through the core network 114. When receiving the forced transmission-stop control message, the radio network controller 102 releases all the radio transmission settings for the radio base station 104 to stop transmission (see the sequence S20 of FIG. 3). Accordingly, the radio base station 104 stops transmitting radio waves and thereby an increase of interference power due to excessively increased transmission power of the radio base station 104 can be efficiently suppressed.

When the first counter $C_{UE}$ has not reached the predetermined value $C_{TH1}$ yet (NO in step S75), it is determined whether the second counter $C_{NODE-B}$ is greater than the second predetermined value $C_{TH2}$ (step S79). When the second counter $C_{NODE-B}$ has reached the second predetermined value $C_{TH2}$ (YES in step S79), the radio-system management server 116 also determines that forced transmission-stop control should be applied to the radio base station 104, which is specified as an excessive transmission-power base station by other radio base stations and mobile terminals (step S76).

After the forced transmission-stop control has been determined (step S76) or when the second counter $C_{NODE-B}$ has not reached the second predetermined value $C_{TH2}$ yet (NO in step S79), the radio-system management server 116 initializes the timer for measuring the predetermined time period and clears the first and second counters $C_{UE}$ and $C_{NODE-B}$ (step S77) and then the control exits this determination routine.

As described above, the radio network controller 102 receives the forced transmission-stop control message and thereby releases all the radio transmission settings for the radio base station 104 to stop transmission. Accordingly, the radio base station 104 stops transmitting radio signals of excessively increased transmission power, which eliminates interference with other radio base stations and mobile terminals in the vicinity of the radio base station 104.

Although the invention has been described in its preferred embodiments, it is understood that the present disclosure of the preferred embodiments has been changed in the details of construction and the combination and arrangement of parts may be resorted to without departing from the spirit and the scope of the present invention.

For example, as described above, the present invention is applied to the CDMA mobile communications system in which the excessive transmission power may be an important issue for the system. However, the present invention may be applied to other types of mobile communications system according to FDMA and/or TDMA scheme.

As described above, when a radio network controller receives the forced transmission-stop control message for a radio base station transmitting radio signals of excessive transmission power from the radio-system management server, the radio network controller releases all the radio transmission settings for the radio base station to stop transmission. In addition, the radio base station may be controlled such that it is rebooted or its network connection is rejected.

The cause of excessively increased transmission power of a radio base station may be not only failure and modifications without permission but also hacking the core control section (CC) of a radio base station to modify its transmission power control settings.

As described above, the present invention is preferably applied to a mobile communications system employing multiple-access techniques of efficiently multiplexing radio signals transmitted by a plurality of user terminals located at multiple geographic points. Especially, the present invention is more preferably applied to the CDMA mobile communications system.

The invention claimed is:

1. A mobile communications system comprising a plurality of radio base stations and a plurality of mobile terminals, further comprising:
    a first determination section for determining whether a certain radio base station transmits radio waves of excessive power, wherein the first determination section is provided in each of the radio base stations and/or the mobile terminals;
    a second determination section for determining whether the certain radio base station transmits radio waves of excessive power, based on determination results obtained by a plurality of first determination sections; and
    a controller for instructing the certain radio base station to forcefully stop its radio transmission when it is determined that the certain radio base station transmits radio waves of excessive power.

2. The mobile communications system according to claim 1, wherein the first determination section uses power of a radio wave received from the certain radio base station to determine whether the certain radio base station transmits radio waves of excessive power.

3. The mobile communications system according to claim 2, wherein, when the power of a radio wave received from the certain radio base station exceeds a predetermined power threshold successively a predetermined number of times, the first determination section determines that the certain radio base station transmits radio waves of excessive power.

4. The mobile communications system according to claim 1, wherein, when the first determination section determines that a certain radio base station transmits radio waves excessive power, a piece of detection information is transmitted to the second determination section,
  wherein the second determination section determines whether the certain radio base station transmits radio waves of excessive power, based on the number of pieces of detection information received.

5. The mobile communications system according to claim 4, wherein, when the number of pieces of detection information received exceeds a predetermined threshold count for a predetermined period of time, the second determination section determines that the certain radio base station transmits radio waves of excessive power.

6. The mobile communications system according to claim 4, wherein the second determination section comprises a counter which is incremented every time a piece of detection information is received.

7. The mobile communications system according to claim 4, wherein the second determination section comprises:
  a source determination section for determining whether a source from which a piece of detection information has been received is a mobile terminal or a radio base station; and
  a counter which is incremented by an amount modified by a weight that is differently determined depending on whether the source is a mobile terminal or a radio base station.

8. The mobile communications system according to claim 4, wherein the second determination section comprises:
  a source determination section for determining whether a source from which a piece of detection information has been received is a mobile terminal or a radio base station; and
  a first counter which is incremented every time a piece of detection information is received from a mobile terminal; and
    a second counter which is incremented every time a piece of detection information is received from a radio base station,
    wherein when at least one of the first and second counters exceeds a corresponding predetermined threshold count, the second determination section determines that the certain radio base station transmits radio waves of excessive, power.

9. A method for monitoring and controlling a radio base station in a mobile communications system comprising a plurality of radio base stations, a plurality of mobile terminals and a system manager, comprising:
  at each of radio base stations and/or mobile terminals,
    a) determining whether a radio base station transmits radio waves of excessive power;
    b) when it is determined that a certain radio base station transmits radio waves of excessive power, transmitting a piece of detection information:
  at the system manager,
    c) determining based on received detection information whether the certain radio base station transmits radio waves of excessive power; and
    d) when it is determined that the certain radio base station transmits radio waves of excessive power, instructing the certain radio base station to forcefully stop its radio transmission, 10. The method according to claim 9, wherein step a) comprises:
  measuring received power of a radio wave received from the certain radio base station; and
  comparing the received power with a predetermined power threshold to determine whether the certain radio base station transmits radio waves of excessive power.

11. The method according to claim 10, wherein, when the received power exceeds the predetermined power threshold successively a predetermined number of times, it is determined that the certain radio base station transmits radio waves of excessive power.

12. The method according to claim 9, wherein step c) comprises:
  counting the number of pieces of received detection information for a predetermined period of time; and
  comparing the number of pieces of received detection information with a predetermined threshold count to determine whether the certain radio base station transmits radio waves of excessive power.

13. The method according to claim 9, wherein step c) comprises:
  determining whether a source from which a piece of detection information has been received is a mobile terminal or a radio base station;
  counting the number of pieces of received detection information modified by a weight for a predetermined period of time, wherein the weight is differently determined depending on whether the source is a mobile terminal or a radio base station; and
  comparing a weighted count of pieces of received detection information with a predetermined threshold count to determine whether the certain radio base station transmits radio waves of excessive power.

14. The method according to claim 9, wherein step c) comprises:
  determining whether a source from which a piece of detection information has been received is a mobile terminal or a radio base station;
  counting the number of pieces of first detection information received from a mobile terminal for a predetermined period of time;
  counting the number of pieces of second detection information received from a radio base station for the predetermined period of time; and
  when at least one of the numbers of pieces of first and second detection information exceeds a corresponding predetermined threshold count, determining that the certain radio base station transmits radio waves of excessive power.

15. A radio base station in a mobile communications system comprising a plurality of radio base stations and a plurality of mobile terminals, comprising:
  a first radio communication section for communicating with mobile terminals;
  a second radio communication section for receiving radio signals from other radio base stations;
  a determination section for determining whether another radio base station transmits a radio signal of excessive power;
  a communication section for transmitting a piece of detection information to a system manager when the determination section determines that a certain radio base station transmits radio waves of excessive power, wherein the detection information includes identification information of the certain radio base station; and
  a controller for stopping radio transmission when receiving a forced transmission-stop control message from the system manager.

16. The radio base station according to claim 15, wherein the determination section uses power of a radio signal received from the certain radio base station to determine whether the certain radio base station transmits radio waves of excessive power.

17. The radio base station according to claim 16, wherein, when the power of a radio signal received from the certain radio base station exceeds a predetermined power threshold successively a predetermined number of times, the determination section determines that the certain radio base station transmits radio waves of excessive power.

18. In a mobile communications system comprising a plurality or radio base stations, a radio base station controller for controlling the radio base stations, and a radio-system management server, wherein each of the radio base stations comprises:
   a first excessive transmission power determination section for determining whether a certain radio base station transmits radio waves of excessive power; and
   a determination result transmission section for transmitting a determination result to the radio base station controller,
   wherein the radio-system management server comprises:
   a second excessive transmission power determination section for determining whether the certain radio base station transmits radio waves of excessive power, based on determination results received from the radio base station controller; and
   a forced transmission stop controller For transmitting an instruction to the radio base station controller to forcefully stop radio transmission of the certain radio base station when it is determined that the certain radio base station transmits radio waves of excessive power;
   a mobile terminal comprising:
   a radio communication section for communicating with radio base stations;
   a determination section for determining whether a certain radio base station transmits a radio signal of excessive power; and
   a communication section for transmitting a piece of detection information to a system manager via at least one radio base station when the determination section determines that a certain radio base station transmits radio waves of excessive power, wherein the detection information includes identification information of the certain radio base station.

19. The mobile terminal according to claim 18, wherein the determination section uses power of a radio signal received from the certain radio base station to determine whether the certain radio base station transmits radio waves of excessive power.

20. The mobile terminal according to claim 19, wherein, when the power of a radio signal received from the certain radio base station exceeds a predetermined power threshold successively a predetermined number of times, the determination section determines that the certain radio base station transmits radio waves of excessive power.

21. A system manager of a mobile communications system comprising a plurality of radio base stations and a plurality of mobile terminals, comprising:
   a determination section for determining whether a certain radio base station transmits radio waves of excessive power, based on a plurality of pieces of detection information received from radio base stations and/or mobile terminals, wherein a piece of detection information indicates excessively increased transmission power of the certain radio base station, which is detected by a mobile terminal or a radio base station; and
   a controller for instructing the certain radio base station to forcefully stop its radio transmission when the determination section determines that the certain radio base station transmits radio waves of excessive power.

22. The system manager according to claim 21, wherein the determination section determines whether the certain radio base station transmits radio waves of excessive power, based on the number of pieces of detection information received.

23. The system manager according to claim 22, wherein, when the number of pieces of detection information received exceeds a predetermined threshold count for a predetermined period of time, the determination section determines that the certain radio base station transmits radio waves of excessive power.

24. The system manager according to claim 22, wherein the determination section comprises a counter which is incremented every time a piece of detection information is received.

25. The system manager according to claim 22, wherein the determination section comprises:
   a source determination section for determining whether a source from which a piece of detection information has been received is a mobile terminal or a radio base station; and
   a counter which is incremented by an amount modified by a weight that is differently determined depending on whether the source is a mobile terminal or a radio base station.

26. The system manager according to claim 22, wherein the determination section comprises:
   a source determination section for determining whether a source from which a piece of detection information has been received is a mobile terminal or a radio base station; and
   a first counter which is incremented every time a piece of detection information is received from a mobile terminal; and
   a second counter which is incremented every time a piece of detection information is received from a radio base station,
   wherein when at least one of the first and second counters exceeds a corresponding predetermined threshold count, the determination section determines that the certain radio base station transmits radio waves of excessive power.

27. A mobile communications system comprising a plurality of radio base stations, a plurality of mobile terminals, a radio base station controller for controlling the radio base stations, and a radio-system management server,
   wherein each of the radio base stations and/or the mobile terminals comprises:
   a first excessive transmission power determination section for determining whether a certain radio base station transmits radio waves of excessive power; and
   a determination result transmission section for transmitting a determination result to the radio base station controller,
   wherein the radio system management server comprises:
   a second excessive transmission power determination section for determining whether the certain radio base station transmits radio waves of excessive power, based on determination results received from the radio base station controller; and
   a forced transmission stop controller for transmitting an instruction to the radio base station controller to forcefully stop radio transmission of the certain radio base station when it is determined that the certain radio base station transmits radio waves of excessive power.

* * * * *